United States Patent
Ginovski et al.

(10) Patent No.: US 10,688,749 B2
(45) Date of Patent: Jun. 23, 2020

(54) PANEL AND METHOD FOR PRODUCING A PANEL

(71) Applicant: DIEHL AIRCABIN GMBH, Laupheim (DE)

(72) Inventors: Mirko Ginovski, Augsburg (DE); Jens Mueller, Ulm (DE); Michael Grabow, Hamburg (DE); Benjamin Grenzing, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 353 days.

(21) Appl. No.: 14/646,592

(22) PCT Filed: Nov. 18, 2013

(86) PCT No.: PCT/EP2013/003467
§ 371 (c)(1),
(2) Date: May 21, 2015

(87) PCT Pub. No.: WO2014/079553
PCT Pub. Date: May 30, 2014

(65) Prior Publication Data
US 2015/0273789 A1    Oct. 1, 2015

(30) Foreign Application Priority Data
Nov. 21, 2012   (DE) ......................... 10 2012 022 713

(51) Int. Cl.
*B32B 3/12* (2006.01)
*B64C 1/06* (2006.01)
(Continued)

(52) U.S. Cl.
CPC .............. *B32B 3/12* (2013.01); *B29D 24/005* (2013.01); *B29D 99/001* (2013.01); *B32B 3/263* (2013.01);
(Continued)

(58) Field of Classification Search
CPC .. E04C 2/365; E04B 2001/748; E04B 1/8209; E04B 1/84; E04B 1/8409;
(Continued)

(56) References Cited

U.S. PATENT DOCUMENTS 1,925,453 A * 9/1933 Mazer ....................... E04B 1/86
160/DIG. 7
2,728,479 A * 12/1955 Wheeler ................ B65D 65/44
156/197
(Continued)

FOREIGN PATENT DOCUMENTS

DE    1816894 U    8/1960
DE    2302989      8/1973
(Continued)

OTHER PUBLICATIONS

International Search Report, dated Mar. 31, 2014.

*Primary Examiner* — Jessica L Laux
(74) *Attorney, Agent, or Firm* — Greer, Burns & Crain, Ltd.

(57) ABSTRACT

A panel for cladding a ceiling or wall in a cabin, especially the cabin of a passenger aircraft, in which a board is laminated on both sides with a cover layer which is made of fibrous material or fabric, which is impregnated with resin or a thermoplastic material, and is cured under the effects of pressure and temperature, said board having at least one core with a honeycomb structure formed by a large number of walls, said walls being compressed or bent in a pre-defined region of the board by between 5% and 50%.

10 Claims, 3 Drawing Sheets

(51) Int. Cl.
*B32B 37/10* (2006.01)
*B32B 37/14* (2006.01)
*G10K 11/172* (2006.01)
*B29D 99/00* (2010.01)
*B29D 24/00* (2006.01)
*B64C 1/40* (2006.01)
*B32B 3/26* (2006.01)
*B32B 5/02* (2006.01)
*B32B 38/00* (2006.01)

(52) U.S. Cl.
CPC ............... *B32B 5/02* (2013.01); *B32B 37/10* (2013.01); *B32B 37/1054* (2013.01); *B32B 37/146* (2013.01); *B64C 1/066* (2013.01); *B64C 1/40* (2013.01); *G10K 11/172* (2013.01); *B32B 2038/0024* (2013.01); *B32B 2260/046* (2013.01); *B32B 2262/0269* (2013.01); *B32B 2262/067* (2013.01); *B32B 2305/024* (2013.01); *B32B 2307/102* (2013.01); *B32B 2605/18* (2013.01); *B32B 2607/00* (2013.01); *Y02T 50/46* (2013.01); *Y10T 428/24149* (2015.01)

(58) Field of Classification Search
CPC ........ E04B 9/001; E04B 9/0442; E04B 9/045; G10K 11/172; B32B 3/12; B32B 5/02; B32B 3/263; B32B 37/10; B64C 1/40; B62D 33/0604; B60R 13/0815; B60R 13/083; F16B 5/01
USPC ........... 428/311.11, 116–118; 52/144, 302.1; 181/284–292; 105/355, 357, 404, 422; 156/242, 245, 292; 296/39.3; 244/1 N, 244/118.5, 118.6, 119, 120, 123.13, 123.6
See application file for complete search history.

(56) References Cited

U.S. PATENT DOCUMENTS

| | | | | |
|---|---|---|---|---|
| 3,104,194 A * | 9/1963 | Zahorski | ............... | E04C 2/34 156/197 |
| 3,196,533 A * | 7/1965 | Ida | ............... | B21D 47/00 29/421.2 |
| 3,211,253 A * | 10/1965 | Gonzalez | ............... | E04B 1/86 181/292 |
| 3,412,513 A | 11/1968 | Goesele | | |
| 3,529,693 A * | 9/1970 | Gray | ............... | B21D 47/00 181/292 |
| 3,687,223 A * | 8/1972 | Streck | ............... | E04B 1/86 181/292 |
| 3,687,767 A | 8/1972 | Reisman et al. | | |
| 3,757,559 A | 9/1973 | Welsh | | |
| 3,821,999 A * | 7/1974 | Guess | ............... | G10K 11/172 181/296 |
| 4,001,473 A * | 1/1977 | Cook | ............... | B32B 3/12 181/292 |
| 4,254,171 A * | 3/1981 | Beggs | ............... | E04B 1/86 156/182 |
| 4,269,882 A * | 5/1981 | Carrillo | ............... | B32B 3/12 156/150 |
| 4,271,219 A * | 6/1981 | Brown | ............... | B32B 3/12 156/292 |
| 4,301,890 A * | 11/1981 | Zalas | ............... | B32B 3/12 181/286 |
| 4,479,992 A * | 10/1984 | Haeseker | ............... | B29D 24/007 181/288 |
| 4,522,284 A * | 6/1985 | Fearon | ............... | B29D 24/005 156/290 |
| 4,598,007 A * | 7/1986 | Kourtides | ............... | B32B 3/12 428/116 |
| 4,641,726 A * | 2/1987 | Fearon | ............... | E04B 1/8209 156/290 |
| 4,855,182 A * | 8/1989 | Ondrejas | ............... | B29C 73/10 428/116 |
| 4,879,152 A * | 11/1989 | Green | ............... | B32B 3/12 156/286 |
| 5,037,498 A * | 8/1991 | Umeda | ............... | B29C 31/00 156/307.3 |
| 5,044,578 A * | 9/1991 | White | ............... | B64C 1/066 244/117 R |
| 5,306,066 A * | 4/1994 | Saathoff | ............... | B60J 5/0451 188/377 |
| 5,417,788 A * | 5/1995 | Holt | ............... | B29C 59/02 156/196 |
| 5,462,171 A * | 10/1995 | Moog | ............... | B65D 81/113 206/588 |
| 5,540,972 A * | 7/1996 | Jaegers | ............... | B31D 3/0292 156/292 |
| 5,887,402 A * | 3/1999 | Ruggie | ............... | B32B 3/30 52/455 |
| 5,919,545 A * | 7/1999 | Giezendanner | ............... | B29C 53/04 156/196 |
| 6,051,302 A * | 4/2000 | Moore | ............... | B29C 70/08 239/265.19 |
| 6,251,497 B1 * | 6/2001 | Hoopingarner | ............... | B29C 59/04 428/116 |
| 6,287,678 B1 * | 9/2001 | Spengler | ............... | B29C 44/569 156/228 |
| 6,337,471 B1 * | 1/2002 | Kistner | ............... | B21D 26/055 219/633 |
| 6,371,242 B1 * | 4/2002 | Wilson | ............... | B32B 3/12 181/210 |
| 6,372,322 B1 * | 4/2002 | Devaguptapu | ............... | B32B 3/12 156/197 |
| 6,413,613 B1 | 7/2002 | Byma | | |
| 6,544,622 B1 * | 4/2003 | Nomoto | ............... | D21H 13/26 428/116 |
| 6,753,061 B1 * | 6/2004 | Wedi | ............... | B32B 3/12 428/116 |
| 2002/0012767 A1 * | 1/2002 | Ueda | ............... | B32B 3/12 428/116 |
| 2002/0094412 A1 * | 7/2002 | Murray | ............... | B32B 3/12 428/116 |
| 2002/0170265 A1 * | 11/2002 | Tokonabe | ............... | B32B 3/12 52/793.1 |
| 2002/0172794 A1 * | 11/2002 | Tokonabe | ............... | B32B 3/12 428/69 |
| 2004/0126221 A1 * | 7/2004 | Wolf | ............... | B65D 19/0018 414/814 |
| 2005/0194210 A1 * | 9/2005 | Panossian | ............... | B32B 3/12 181/293 |
| 2006/0083892 A1 * | 4/2006 | Wang | ............... | B32B 3/12 428/72 |
| 2006/0204714 A1 * | 9/2006 | Wang | ............... | B31D 3/0284 428/116 |
| 2007/0134466 A1 * | 6/2007 | Rajaram | ............... | B32B 3/12 428/116 |
| 2007/0275212 A1 * | 11/2007 | Stadtlander | ............... | B29C 73/10 428/116 |
| 2008/0145598 A1 * | 6/2008 | Levit | ............... | B32B 3/12 428/116 |
| 2008/0145600 A1 * | 6/2008 | Hendren | ............... | B31D 3/0292 428/116 |
| 2008/0145601 A1 * | 6/2008 | Levit | ............... | B29C 73/06 428/116 |
| 2008/0233346 A1 * | 9/2008 | Bogue | ............... | B29C 73/06 428/116 |
| 2008/0318000 A1 * | 12/2008 | Horigome | ............... | B32B 3/12 428/116 |
| 2009/0155526 A1 * | 6/2009 | Levit | ............... | B32B 3/12 428/116 |
| 2009/0173572 A1 * | 7/2009 | Grenzing | ............... | G10K 11/172 181/292 |
| 2009/0214818 A1 * | 8/2009 | Levit | ............... | B32B 3/12 428/116 |

(56) References Cited

U.S. PATENT DOCUMENTS

| | | | | |
|---|---|---|---|---|
| 2009/0246502 A1* | 10/2009 | Hoetzeldt | ............. | B32B 5/26 428/304.4 |
| 2009/0252920 A1* | 10/2009 | Khan | ............. | B32B 3/12 428/116 |
| 2009/0263620 A1* | 10/2009 | Balthes | ............. | E04C 2/246 428/116 |
| 2010/0015392 A1* | 1/2010 | Bradish | ............. | B29B 13/024 428/116 |
| 2010/0247849 A1* | 9/2010 | Depaoli | ............. | B26D 3/085 428/116 |
| 2011/0024058 A1* | 2/2011 | Kernmayer | ............. | B60R 13/02 160/113 |
| 2011/0244175 A1* | 10/2011 | Kehrle | ............. | D21H 13/26 428/119 |
| 2011/0281063 A1* | 11/2011 | Levit | ............. | B32B 3/12 428/116 |
| 2011/0300329 A1* | 12/2011 | Kowalski | ............. | B32B 3/12 428/116 |
| 2012/0094061 A1* | 4/2012 | Diderich | ............. | B32B 29/00 428/116 |
| 2012/0282434 A1* | 11/2012 | Cawse | ............. | C08G 59/3227 428/116 |
| 2013/0000247 A1* | 1/2013 | Sypeck | ............. | B21D 47/00 52/793.1 |
| 2013/0000826 A1* | 1/2013 | Katz | ............. | B29B 17/0042 156/196 |
| 2013/0183484 A1* | 7/2013 | Conley | ............. | B32B 3/28 428/116 |
| 2013/0278019 A1* | 10/2013 | Preisler | ............. | B60R 5/04 296/193.07 |
| 2014/0224576 A1* | 8/2014 | Staudt | ............. | E04B 1/84 181/290 |
| 2015/0050446 A1* | 2/2015 | Stamp | ............. | B29C 43/52 428/73 |
| 2015/0104605 A1* | 4/2015 | Conley | ............. | B32B 27/08 428/116 |
| 2015/0247298 A1* | 9/2015 | Li | ............. | E01C 9/007 428/116 |
| 2015/0273789 A1* | 10/2015 | Ginovski | ............. | B29D 24/005 428/116 |
| 2015/0290920 A1* | 10/2015 | Braden | ............. | B32B 37/146 156/210 |
| 2016/0176140 A1* | 6/2016 | Wolfsberger | ............. | B29D 99/0089 428/116 |
| 2017/0129204 A1* | 5/2017 | Mori | ............. | B32B 5/024 |

FOREIGN PATENT DOCUMENTS

| | | |
|---|---|---|
| EP | 0787578 | 8/1997 |
| EP | 1078821 | 2/2001 |
| FR | 1260187 | 5/1961 |

* cited by examiner

PANEL AND METHOD FOR PRODUCING A PANEL

CROSS-REFERENCES TO RELATED APPLICATIONS

This application claims the benefit of the German patent application No. 10 2012 022 713.2 filed on Nov. 21, 2012, the entire disclosures of which are incorporated herein by way of reference.

FILED OF THE INVENTION

The invention relates to a panel for cladding a ceiling or wall in a cabin, especially the cabin of a passenger aircraft, and to a method for producing such a panel.

BACKGROUND OF THE INVENTION

Panels widely referred to as "sandwich panels" are known in the art and used in particular for cladding ceilings and/or walls in passenger aircraft cabins. Such a sandwich panel consists of a lightweight core, which is laminated on both sides with a cover layer. The core comprises a honeycomb structure formed by a large number of walls. These cell walls are manufactured from a fiber paper impregnated with phenol resin, but other materials such as cardboard, plastics material, etc. can also be used. The cover layer usually consists of a fibrous material or fabric impregnated with resin. To produce the sandwich panel, the two opening planes of the honeycomb board are each covered with a semi-finished product or prepreg, which is formed from a fibrous material or fabric impregnated with resin. The semi-finished product is laminated together with the honeycomb board under the effect of pressure and temperature. The selected pressure for this process is such that the honeycomb structure of the board is maintained fully.

Sandwich panels are lightweight and have relatively poor sound-absorbing properties. In order to increase flight comfort, the sound-absorbing properties of traditional sandwich panels are no longer regarded as adequate. To improve sound insulation, the current practice is to insert a layer of silicon film and/or glass wool on the rear side of the cabin wall or ceiling and on the sandwich panel. Although this improves sound insulation, it simultaneously detrimentally increases the weight of the aircraft.

DE 23 02 989 A describes a method for bending a sandwich board, in which the sandwich board comprises cover layers made from sheet metal and a core that is rigidly connected to these layers, said board being bent while simultaneously crushing the core until the required bending angle is achieved. Further prior art is described in FR 1 260 187 A, U.S. Pat. No. 3,687,767 A, U.S. Pat. No. 3,412,513 A and DE 18 16 894 U.

SUMMARY OF THE INVENTION

It is one idea of the invention to eliminate the disadvantages of the prior art. In particular, the idea is to achieve a panel with improved sound-absorbing properties. A further idea of the invention is to achieve a method for producing such a panel which is as simple and as cost-effective as possible.

Accordingly, a panel is proposed for cladding a ceiling or wall in a cabin, especially the cabin of a passenger aircraft, in which a board is laminated on both sides with a cover layer which is made of fibrous material or fabric, which is impregnated with resin or a thermoplastic material, and is cured under the effects of pressure and temperature, said board having at least one core with a honeycomb structure formed by a large number of walls. The walls of the honeycomb structure are compressed or bent in a pre-defined region of the board, especially in sections or in part, by between 5% and 50%, preferably by between 10% and 50%.

In embodiments of the invention it is proposed that the cell walls are or have been compressed or bent in such a way that an increased transmission loss is achieved in a frequency range above 700 Hz.

The cell walls can be manufactured from a paper, especially fiber paper. The cell walls of the honeycomb structure preferably run in parallel with or substantially in parallel with, and/or at an acute angle to the normal direction of the cover layer. The honeycomb material may also be a foam material in which the walls forming the pores of the foam material are compressed in such a way that the thickness of the core is reduced by from 5% to 50%, preferably by from 10% to 50%.

The sound-absorbing properties of the panel or board can be improved by compressing or bending, especially in such a way that the thickness of the core is reduced by from 5% to 50%, preferably by from 10% to 50%. The additional glass wool or heavy layer additionally proposed in the prior art for sound insulation purposes can be omitted by using the panel according to the invention. By using the panel according to the invention, it is possible to produce a sandwich component for a passenger aircraft with reduced outlay and weight.

The pre-defined region in which the panel, or more precisely the core, is compressed or bent may be one or more regions that are at least partially adjacent to uncompressed core regions. The pre-defined region/s may be at least partially surrounded and/or bordered by uncompressed core regions. The pre-defined region in which the core is bent or compressed may make up at least 50% of the surface of the panel as a whole. Uncompressed regions can be left as a form of web with a particular view to improving the mechanical strength of the panel. However, it is also possible for the panel to have a compressed core across its entire surface. In this case, the cell walls should be regarded as being compressed or bent by from 5% to 50% or from 10% to 50% in relation to the panel with an uncompressed core.

For reasons of expediency, the honeycomb structure is produced from resin-impregnated fiber paper. The fiber paper may be manufactured from aramid fibers. In a foam-like core, said core may be produced from a foam plastics material, and in particular from a closed-pore or open-pore plastics material.

The cover layer may be formed from a fibrous material or fabric impregnated with a resin. A cover layer of this kind may be produced under the effect of pressure and temperature from a prepreg.

Also according to the invention, a method for producing a panel for cladding a ceiling or wall in a cabin, especially the cabin of a passenger aircraft, proposes that a compressive force is applied in such a way to a pre-defined region of the board during production, and in particular that such a high pressure is exerted on the board that its original thickness is reduced by from 5% to 50%, preferably by from 10% to 50%, as a result of bending and/or compressing cell walls in the core of the board in a pre-defined region, such that the reduction in thickness achieved by bending and/or compressing is maintained in the finished board.

The cell walls can be compressed and/or bent and weakened in the pre-defined region by exerting a pressure on the board as proposed according to the invention, i.e., said cell walls display bulges, bends or similar shapes in the deformed state, which can have a positive effect on the sound-absorbing properties of the panel. The proposed method can be implemented simply and cost-effectively, with the result, in particular, that the sound-absorbing properties of a panel can be improved in a relatively simple manner. In this respect the method can also be a method for producing a sound-absorbing panel or a method for improving the sound-absorbing properties of panels comprising a honeycomb structure formed by a large number of cell walls and provided with at least one cover layer.

A compressive force may be applied to regions of the panel or over its entire surface in order to produce the bends or compressions. If pressure is applied partially or to regions of the panel, uncompressed regions may be adjacent to compressed regions. The uncompressed regions may, for example, run along one side of the compressed regions or may border the compressed regions.

In accordance with the present invention, the term "board thickness" is understood to mean the height of the cell walls forming the honeycomb structure. In order to deform the walls, a force is preferably exerted on the honeycomb structure, the vector of said force running substantially in parallel with the webs of the honeycomb, or in parallel with the normal direction, in particular the local normal direction, of the panel.

For reasons of expediency, the original thickness of the board is reduced by from 10 to 30%, preferably from 15 to 25%. As the thickness is only partially reduced, the strength of the overall panel can be substantially maintained or, at the very least, it is possible to avoid unduly affecting the strength of the panel.

A semi-finished product is advantageously used to produce the cover layer and is formed from an impregnated fibrous material or fabric. The fibers may be glass fibers, carbon fibers, aramid fibers or similar. The semi-finished product is available as a prepreg for reasons of expediency. A prepreg of this kind can be compressed together with the board quickly and easily by the effects of pressure and temperature.

The intended deformation and weakening of the cell walls can be achieved in one step during production, especially as part of the panel-compression process, the cover layers being applied to the honeycomb or core during said compression process.

BRIEF DESCRIPTION OF THE DRAWINGS

The invention will be explained in greater detail with reference to exemplary embodiments depicted in the drawings as appended.

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

Figure 1:
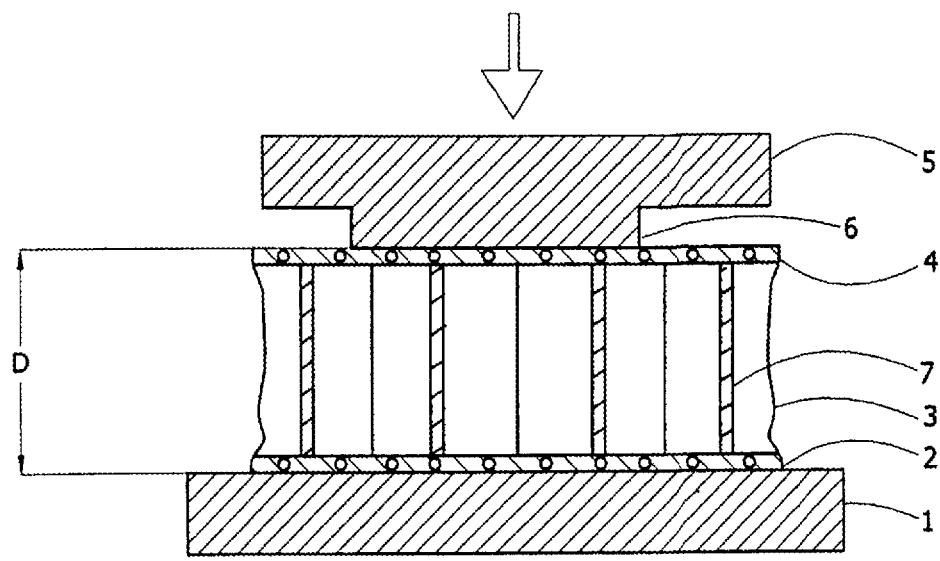
FIG. 1 schematically illustrates a sectional view during a first method step for producing the panel.

In the figures, like reference numerals denote like or functionally like components, unless indicated otherwise. Any directional terminology like "top", "bottom", "left", "right", "above", "below", "horizontal", "vertical", "back", "front", and similar terms are merely used for explanatory purposes and are not intended to delimit the embodiments to the specific arrangements as shown in the drawings.

Although specific embodiments have been illustrated and described herein, it will be appreciated by those of ordinary skill in the art that a variety of alternate and/or equivalent implementations may be substituted for the specific embodiments shown and described without departing from the scope of the present invention. Generally, this application is intended to cover any adaptations or variations of the specific embodiments discussed herein.

DETAILED DESCRIPTION OF THE PREFERRED EMBODIMENTS

FIG. 1 is a schematic sectional view of a first method step. A first prepreg 2 is laid on a press bed 1. A honeycomb board 3 is placed on top, with a second prepreg 4 being placed on top of said board in turn. Reference numeral 5 relates to a press die.

The first prepreg 2 and second prepreg 4 may, for example, comprise a fibrous material or fabric that is pre-impregnated.

The honeycomb board 3 is formed by a large number of cell walls 7, which are, for example, made of a fiber paper formed from aramid fibers. The fiber paper is, for example, impregnated with a phenol resin. The cell walls 7 form a honeycomb structure. The two opening planes of the honeycomb board 3, which are covered by the first prepreg 2 and the second prepreg 4, run perpendicular to the walls 7.

Figure 2:
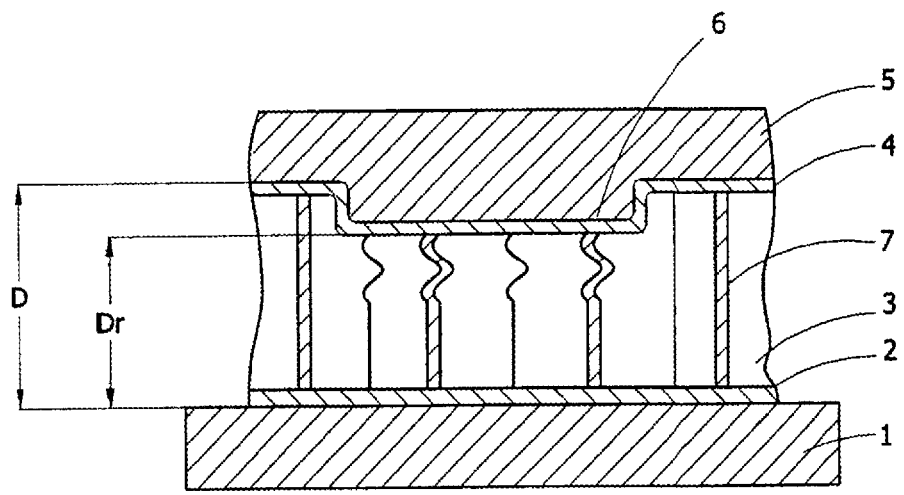
FIG. 2 schematically illustrates a sectional view during a second method step for producing the panel.

In the second method step illustrated in FIG. 2, the die 5 is moved in the direction of the press bed 1, thus exerting pressure on the stack positioned between said die and said press bed. A temperature ranging from 100 to 230° C. is applied at the same time. The prepreg and the honeycomb are deformed and the various layers are bonded by applying pressure and temperature.

By exerting pressure on the board 3, the cell walls 7 are plastically deformed in the pre-defined region of the board 3 located beneath the projection 6. The cell walls display irregular bulges, corrugations and/or bends. The prepregs 2, 4 are simultaneously compressed by the fusing resin or adhesive layer contained therein to form dense cover layers and are fused with the cell walls 7 of the board 3. FIG. 2 shows the original thickness of the board 3, identified as reference sign D. A reduced thickness Dr in the pre-defined region corresponds to approximately 0.8 to 0.9 times the thickness D.

Figure 3:
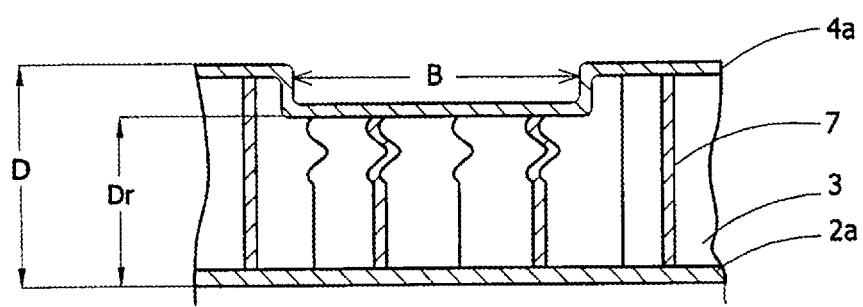
FIG. 3 schematically illustrates a sectional view of the panel produced.

FIG. 3 is a schematic sectional view through a panel produced according to the above-mentioned method. A first cover layer formed by the first prepreg 2 is identified as reference numeral 2a and a second cover layer formed by the second prepreg 4 is identified as reference numeral 4a. The walls 7 of the board 3 laminated between the first cover layer 2a and the second cover layer 4a are deformed irregularly in the pre-defined region B. They have bulges, corrugations and/or bends.

Figure 4:
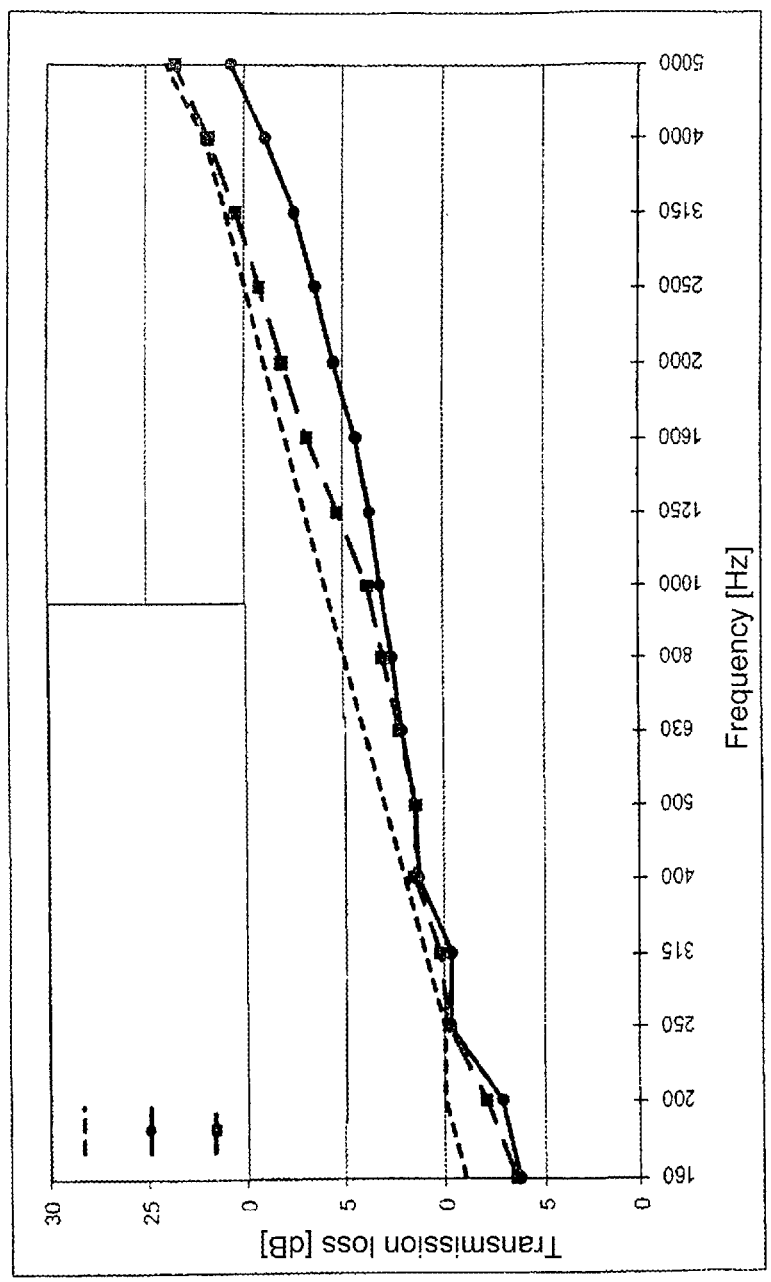
FIG. 4 schematically illustrates a transmission loss plotted over frequency.

The graphs shown in FIG. 4 show transmission loss plotted over frequency. The measured values identified by dots depict the noise-absorbing properties of a traditional panel without deformed walls, whereas the measured values shown as squares depict the sound-absorbing properties of a panel according to the invention. The broken line represents a manufacturer's specification.

As shown in FIG. 4, the panel according the invention displays an improved transmission loss and thus improved sound-absorbing properties, particularly in a frequency range above approximately 700 Hz. This improvement of approximately 3 dB in this particular case would increase the weight by 40% if achieved by means of a conventional mass covering.

In the described method, it is advantageous if the cell walls 7 are deformed and the first cover layer 2a and the second cover layer 4a are laminated at the same time. However, within the scope of the present invention, the walls 7 may also be deformed in the respective pre-defined region B before the cover layers 2a, 4a are laminated. In this case, it is merely necessary to apply a lower pressure when laminating the cover layers 2a, 4a, as it is no longer necessary to deform the walls 7 during the lamination stage.

The pre-defined region B may be a portion of the board 3. However, the pre-defined region B may also extend over the entire board 3. At least one additional pre-defined region (not illustrated here) in which the walls 7 are deformed may also be provided on the opposite side of the board 3 to the pre-defined region B.

A dual-layer core, i.e., a core with two superimposed layers comprising corresponding honeycomb structures, may also be used within the scope of the present invention. Cores having three or more layers would also be possible. The edge region of the multiple-core board having the thickness D may be represented by two boards, especially in consideration of marginal conditions such as statics, cost, use of materials, production processes, etc. A "support layer" measuring 10 mm, for example, may be provided with a further core, e.g. 5 mm, in the edge region. The core or cores in the pre-defined region B may be deformed as described above. Both cores can be simply connected together in the edge region. A relatively thick, i.e., strong, edge region having a comparatively large original thickness can thus be achieved without major deformations being caused or present in the pre-defined region.

The embodiments were chosen and described in order to best explain the principles of the invention and its practical applications, to thereby enable others skilled in the art to best utilize the invention and various embodiments with various modifications as are suited to the particular use contemplated. In the appended claims and throughout the specification, the terms "including" and "in which" are used as the plain-English equivalents of the respective terms "comprising" and "wherein," respectively. Furthermore, "a" or "one" does not exclude a plurality in the present case.

The invention claimed is:

1. A panel for cladding a ceiling or wall in a cabin, comprising:
   a board being laminated on both sides with a cover layer,
      the cover layer being made of fibrous material or fabric,
      the cover layer being impregnated with resin or a thermoplastic material, and being cured under the effects of pressure and temperature,
   said board having at least one core with a honeycomb structure formed by a plurality of walls,
      said walls and said cover layer being equally compressed or bent in a pre-defined region of the board by between 5% and 50% such that sound insulation of the panel is increased, wherein the pre-defined region of the board is defined by compressed portions of both the walls and the cover layer and the equally compressed portions of both the walls and the cover are bordered by uncompressed regions of the board, wherein a thickness of the compressed or bent pre-defined region is less than a thickness of the uncompressed regions of the board.

2. The panel according to claim 1, wherein the compression or bending of the cell walls results in an increased sound transmission loss in a frequency range above 700 Hz, as compared to an otherwise identical board in which said walls are not compressed.

3. A method for producing a panel for cladding a ceiling or wall in a cabin, the panel comprising a board being laminated on both sides with a cover layer, the cover layer being made of fibrous material or fabric, the cover layer being impregnated with resin or a thermoplastic material, and being cured under the effects of pressure and temperature, said board having at least one core with a honeycomb structure formed by a plurality of walls, the method comprising the steps:
   simultaneously compressing the honeycomb structure and the cover layer by applying a sufficiently high pressure to said board in a pre-defined region during production of the board, such that an original thickness of the board is reduced by from 5% to 50% such that sound insulation of the panel is increased such that the reduced thickness is maintained in the finished board, wherein the pre-defined region of the board is bordered by uncompressed regions of the board, wherein a thickness of the pre-defined region is less than a thickness of the uncompressed regions of the board.

4. The method according to claim 3, wherein the original thickness of the board is reduced by 10 to 30%.

5. The method according to claim 3, wherein the original thickness of the board is reduced by 15 to 25%.

6. The method according to claim 3, wherein the board is compressed and reshaped by applying pressure and temperature.

7. The method according to claim 3, wherein the board is produced from impregnated fiber paper.

8. The method according to claim 7, wherein the fiber paper is manufactured from aramid fibers.

9. The method according to claim 3, wherein a semi-finished product is used to produce the cover layers and is formed from a pre-impregnated fibrous material or fabric.

10. A panel for cladding a ceiling or wall in a cabin, comprising:
   a board being laminated on both sides with a cover layer,
      the cover layer being made of fibrous material or fabric,
      the cover layer being impregnated with resin or a thermoplastic material, and being cured under the effects of pressure and temperature,
   said board having at least one core with a honeycomb structure formed by a plurality of walls,
      said walls and the cover layer being compressed or bent in a pre-defined region of the board by between 5% and 50% such that sound insulation of the panel is increased, the pre-defined region of the board is defined by equally compressed portions of both the walls and the cover layer and the equally compressed portions of both the walls and the cover are bordered by an uncompressed thickness of the board such that an edge region of the board comprises the uncompressed thickness, wherein a thickness of the pre-defined region is less than a thickness of the uncompressed regions of the board.

* * * * *